(12) United States Patent
Lisowski et al.

(10) Patent No.: US 9,028,119 B2
(45) Date of Patent: May 12, 2015

(54) LIGHT SYSTEM HAVING OPTIC FOR USE IN A REARVIEW MIRROR ASSEMBLY

(71) Applicant: Gentex Corporation, Zeeland, MI (US)

(72) Inventors: Michael F. Lisowski, Holland, MI (US); Danny L. Minikey, Jr., Fenwick, MI (US)

(73) Assignee: Gentex Corporation, Zeeland, MI (US)

( * ) Notice: Subject to any disclaimer, the term of this patent is extended or adjusted under 35 U.S.C. 154(b) by 0 days.

(21) Appl. No.: 14/142,011

(22) Filed: Dec. 27, 2013

(65) Prior Publication Data

US 2014/0185310 A1  Jul. 3, 2014

Related U.S. Application Data

(60) Provisional application No. 61/746,147, filed on Dec. 27, 2012.

(51) Int. Cl.
| | | |
|---|---|---|
| *F21V 7/00* | (2006.01) | |
| *F21V 7/04* | (2006.01) | |
| *G02B 6/00* | (2006.01) | |
| *B60Q 1/26* | (2006.01) | |
| *B60R 1/12* | (2006.01) | |
| *F21S 8/10* | (2006.01) | |

(52) U.S. Cl.
CPC ............ *B60Q 1/2665* (2013.01); *B60R 1/1207* (2013.01); *F21S 48/215* (2013.01); *F21S 48/236* (2013.01); *F21S 48/24* (2013.01); *B60R 2001/1215* (2013.01)

(58) Field of Classification Search
USPC .......................... 362/135, 509–516, 608–610
See application file for complete search history.

(56) References Cited

U.S. PATENT DOCUMENTS

| | | | |
|---|---|---|---|
| 4,791,339 | A | 12/1988 | Draz et al. |
| 5,779,337 | A | 7/1998 | Saito et al. |
| 6,473,554 | B1 | 10/2002 | Pekla et al. |
| 6,572,233 | B1 | 6/2003 | Northman et al. |

(Continued)

FOREIGN PATENT DOCUMENTS

| | | |
|---|---|---|
| DE | 102005031023 B3 | 1/2007 |
| EP | 2431657 A2 | 3/2012 |

OTHER PUBLICATIONS

Jason H. Karp et al., "Orthogonal and secondary concentration in planar micro-optic solar collectors," Publication, May 17, 2011, 13 pages.

(Continued)

*Primary Examiner* — Sikha Roy
(74) *Attorney, Agent, or Firm* — Price Heneveld LLP; Scott P. Ryan

(57) ABSTRACT

According to another aspect of the present invention, a light system for use in a rearview mirror assembly is provided and includes a light source and a first optical element. Said first optical element has a collection optic configured to direct light received from said light source, a reflector optic in optical communication with said collection optic and configured to reflect light from said collection optic, a plurality of light steering areas configured to steer light propagating in said first optical element, and a light spreading optic configured to spread light exiting said first optical element. A second optical element is in optical communication with said first optical element and is configured to diffuse light received from said first optical element to illuminate an indicia.

25 Claims, 5 Drawing Sheets

(56) References Cited

U.S. PATENT DOCUMENTS

| | | | |
|---|---|---|---|
| 7,018,085 B2* | 3/2006 | Lee et al. | 362/610 |
| 7,046,907 B2* | 5/2006 | Miyashita | 385/146 |
| 7,357,554 B2 | 4/2008 | Weber et al. | |
| 7,497,608 B2 | 3/2009 | Wheatley et al. | |
| 7,942,565 B2* | 5/2011 | Klick et al. | 362/610 |
| 7,944,371 B2* | 5/2011 | Foote et al. | 340/903 |
| 7,982,823 B1 | 7/2011 | Feng | |
| 8,111,444 B2 | 2/2012 | Ko et al. | |
| 2002/0080463 A1 | 6/2002 | Tonar et al. | |
| 2004/0217266 A1 | 11/2004 | Bechtel et al. | |
| 2009/0103183 A1 | 4/2009 | DeLine et al. | |
| 2010/0278480 A1 | 11/2010 | Vasylyev | |
| 2012/0012741 A1 | 1/2012 | Vasylyev | |
| 2012/0033441 A1* | 2/2012 | Sousek et al. | 362/555 |
| 2012/0099325 A1 | 4/2012 | Ghosh et al. | |
| 2013/0094215 A1 | 4/2013 | Jurik et al. | |

OTHER PUBLICATIONS

Chong-Min Chang and Han-Ping D. Shieh, "Design of illumination and projection optics for projectors with single digital micromirror devices," Publication, Jul. 1, 2000, 7 pages.

Patent Cooperation Treaty, International Searching Authority, International Search Report, Written Opinion of the International Searching Authority and Notification of Transmittal, Apr. 10, 2014, 6 Pages.

* cited by examiner

LIGHT SYSTEM HAVING OPTIC FOR USE IN A REARVIEW MIRROR ASSEMBLY

CROSS-REFERENCE TO RELATED APPLICATION

This application claims priority to and the benefit under 35 U.S.C. §119(e) of U.S. Provisional Patent Application No. 61/746,147, filed on Dec. 27, 2012, entitled "LIGHT SYSTEM," the entire disclosure of which is hereby incorporated herein by reference.

FIELD OF THE INVENTION

The present invention generally relates to a light system, and more particularly, a light system having a light optic configured for use in a rearview mirror assembly.

SUMMARY OF THE INVENTION

According to one aspect of the present invention, a light system for use in a rearview mirror assembly is provided and includes a printed circuit board having a first side and a second side. A light source is located on said first side. A first optical element is coupled to said first side and has a collection optic configured to direct light received from said light source, a reflector optic in optical communication with said collection optic and configured to reflect light received from said collection optic, and a plurality of light steering areas configured to steer light propagating in said first optical element, wherein light steered from each of said plurality of light steering areas exits said first optical element via an output surface located adjacent to said collection optic. A second optical element is coupled to said second side and is in optical communication with said first optical element, wherein said second optical element is configured to diffuse light received from said first optical element to illuminate an indicia.

According to another aspect of the present invention, a light system for use in a rearview mirror assembly is provided and includes a light source and a first optical element. Said first optical element has a collection optic configured to direct light received from said light source, a reflector optic in optical communication with said collection optic and configured to reflect light from said collection optic, a plurality of light steering areas configured to steer light propagating in said first optical element, and a light spreading optic configured to spread light exiting said first optical element. A second optical element is in optical communication with said first optical element and is configured to diffuse light received from said first optical element to illuminate an indicia.

According to another aspect of the present invention, a light system for use in a rearview mirror assembly is provided and includes a light source and a first optical element. Said first optical element has a collection optic configured to direct light received from said light source, a reflector optic in optical communication with said collection optic and configured to reflect light received from said collection optic, and at least one light steering area configured to steer light reflected from said reflector optic, wherein light steered from said at least one light steering area exits said first optical element via an output surface located adjacent to said collection optic.

These and other features, advantages, and objects of the present invention will be further understood and appreciated by those skilled in the art by reference to the following specification, claims, and appended drawings.

DETAILED DESCRIPTION

Figure 1:
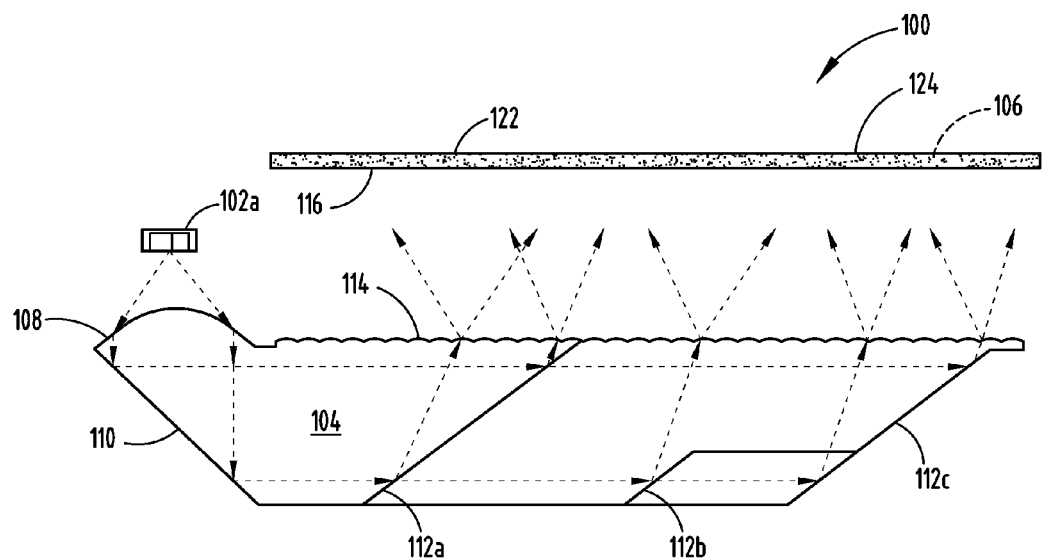
FIG. 1 is a diagram of a light system, in accordance with one embodiment of the present invention.

The present illustrated embodiments reside primarily in combinations of method steps and apparatus components related to a light system. Accordingly, the apparatus components and method steps have been represented, where appropriate, by conventional symbols in the drawings, showing only those specific details that are pertinent to understanding the embodiments of the present invention so as not to obscure the disclosure with details that will be readily apparent to those of ordinary skill in the art having the benefit of the description herein.

Further, like numerals in the description and drawings represent like elements. In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Figure 2:
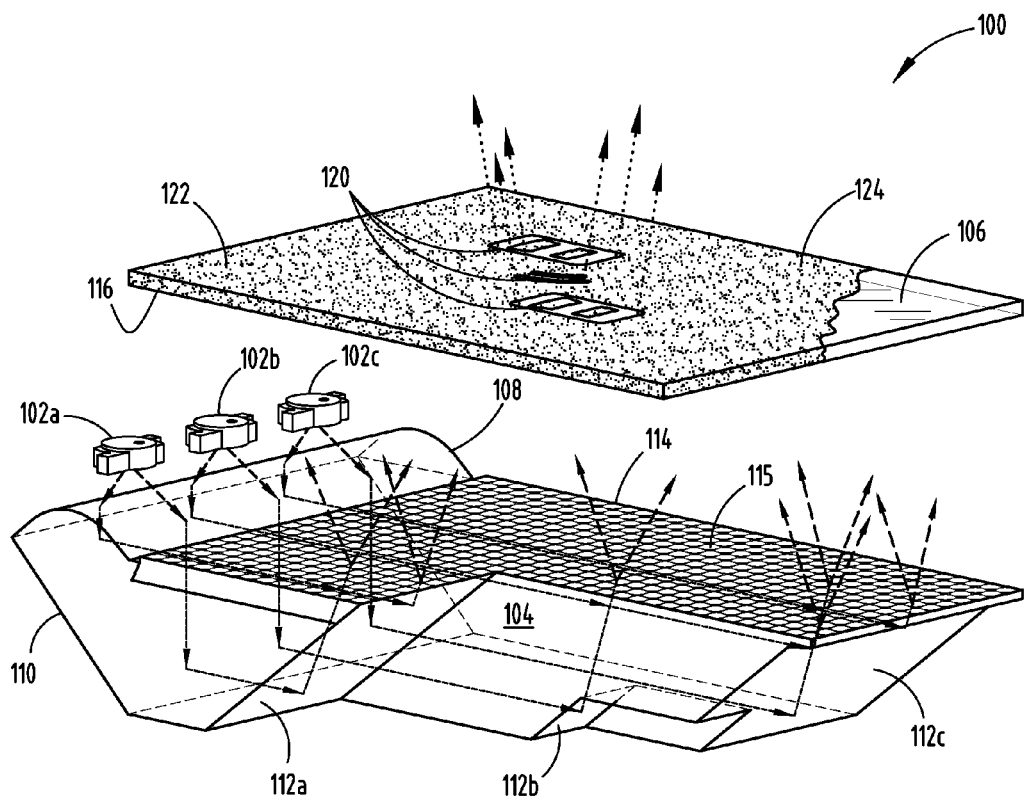
FIG. 2 is a perspective view of the light system of FIG. 1.

The embodiments described herein relate to a light system that can be used in a rearview mirror assembly and is configured to illuminate indicia that can be viewed by an occupant of the vehicle and/or a person proximate the vehicle. Examples include a turn signal, a side blind zone indicator, a lane change assist indicator, an approach lighting indicator, the like, or a combination thereof. The rearview mirror assembly can include an electro-optic mirror element, wherein a reflectance of a mirror element changes based upon light detected by the light sensor and/or a display device that changes intensities based upon the light detected by the light sensor. Examples of rearview assemblies and/or light sensors are described in U.S. Pat. No. 6,870,656, entitled "ELECTRO CHROMIC REARVIEW MIRROR ELEMENT INCORPORATING A THIRD SURFACE REFLECTOR"; U.S. Pat. No. 6,313,457, entitled "MOISTURE DETECTING SYSTEM USING SEMICONDUCTOR LIGHT SENSOR WITH INTEGRAL CHARGE COLLECTION"; U.S. Pat. No. 6,359,274, entitled, "PHOTODIODE LIGHT SENSOR"; U.S. Pat. No. 6,504,142, entitled "PHOTODIODE LIGHT SENSOR"; U.S. Pat. No. 6,402,328, entitled "AUTOMATIC DIMMING MIRROR USING SEMICONDUCTOR LIGHT SENSOR WITH INTEGRAL CHARGE COLLECTION"; U.S. Pat. No. 6,379,013, entitled "VEHICLE EQUIPMENT CONTROL WITH SEMICONDUCTOR LIGHT SENSORS"; U.S. Pat. No. 6,679,608, entitled "SENSOR DEVICE HAVING AN INTEGRAL ANAMORPHIC LENS"; U.S. Pat. No. 6,831,268, entitled "SENSOR CONFIGURATION FOR SUBSTANTIAL SPACING FROM A SMALL APERTURE"; U.S. Pat. No. 7,543,946, entitled "DIMMABLE REARVIEW ASSEMBLY HAVING A GLARE SENSOR"; and U.S. Pat. No. 6,742,904, entitled "VEHICLE EQUIPMENT CONTROL WITH SEMICONDUCTOR LIGHT SENSORS," which are hereby incorporated herein by reference in their entireties In reference to FIGS. 1 and 2, a light system is shown at reference identifier 100. The light system 100 can include a light source, shown as light emitting diodes (LEDs) 102a, 102b, and 102c, a first optical element 104, and an optional second optical element 106. The first optical element 104 can be molded from a light propagating material and can include a collection optic 108, a reflector optic 110, and one or more light steering areas, shown as light steering areas 112a, 112b, and 112c. The second optical element 106 can be molded from a light diffusing material and can be provided separate from the first optical element 104. Alternatively, the first optical element 104 and the second optical element 106 can be combined to form a single integrated optic.

In the illustrated embodiment, the collection optic 108 is configured to direct light received from LEDs 102a, 102b, and 102c. The collection optic 108 can be elongate and have a cylindrical or other anamorphic configuration. As shown, the LEDs 102a-102c are arranged in a linear configuration and spaced along the length of the collection optic 108 and proximately aligned with the collection optic 108. In this manner, the collection optic 108 is capable of directing light received from LEDs 102a, 102b, and 102c in at least one plane. It should be appreciated that other numbers of LEDs can be used and variously positioned such that more than one collection optic can be used.

The reflector optic 110 is in optical communication with the collection optic 108 and is configured to reflect light received therefrom. The reflector optic 110 can include a total internal reflection (TIR) optic or a coated reflector optic. In addition, the reflector optic 110 can be configured to extend the same length as the collection optic 108 to increase the amount of light reflected towards the light steering areas 112a-112c.

Light steering areas 112a, 112b, and 112c are in optical communication with the reflector optic 110 and are configured to steer light propagating in the first optical element 104. Each light steering area 112a-112c can include a TIR optic, coated reflector optic, or a wedge prism. Each light steering area 112a-112c can be variously located and can be parallel or non-parallel with any other light steering area 112a-112c. In addition, each light steering area 112a-112c can be regularly shaped (e.g. light steering area 112a and 112b) or irregularly shaped (e.g. 112c). As shown, light steering areas 112a, 112b, and 112c can each be located at different distances from the reflector optic 110 and can be staggered with respect to one another. In the illustrated embodiment, light steering areas 112a, 112b, and 112c are staggered such that light steering area 112a is positioned to substantially face LED 102a, light steering area 112b is positioned to substantially face LED 102b, and light steering area 112c is positioned to substantially face LED 102c. However, it should be appreciated that other numbers of light steering areas can be used and the location for any given light steering area can vary based on the desired light output from the first optical element 104.

Light steered from the light steering areas 112a-112c exits the first optical element 104 through an output surface 114, which is located adjacent the collection optic 108. The output surface 114 can be a light spreading optic such as, but not limited to, an array of square pillow-typed lenses (e.g. pillow optics) 115 configured to spread light exiting the first optical element 104. In the illustrated embodiment, the collection optic 108 and the output surface 114 together define a first surface of the first optical element 104 such that light emitted from the LEDs 102a-102c enters the first optical element 104 (via the collection optic 108) from a first direction and exits the first optical element 104 optic (via the output surface 114) in a direction that is opposite to the first direction.

Light exiting the first optical element 104 is received in the second optical element 106, which is in optical communication with the first optical element 104 and can be positioned parallel to the first optical element 104. It should be appreciated that the second optical element 106 can be configured in a variety of shapes and/or sizes. In the illustrated embodiment, the second optical element 106 has a planar configuration and receives light through a proximal side 116 located closest to the first optical element 104. Light entering the second optical element 106 is diffused and can be used to substantially evenly or substantially unevenly illuminate an indicia 120 located on a distal side 122 of the second optical element 106 that is located furthest away from the first optical element 104. The indicia 120 can be masked or laser ablated from a coating 124 deposited on the distal side 122 of the second optical element 106. Additionally, other sides of the second optical element 106 can also be coated to prevent light from escaping therethrough.

Figure 3:
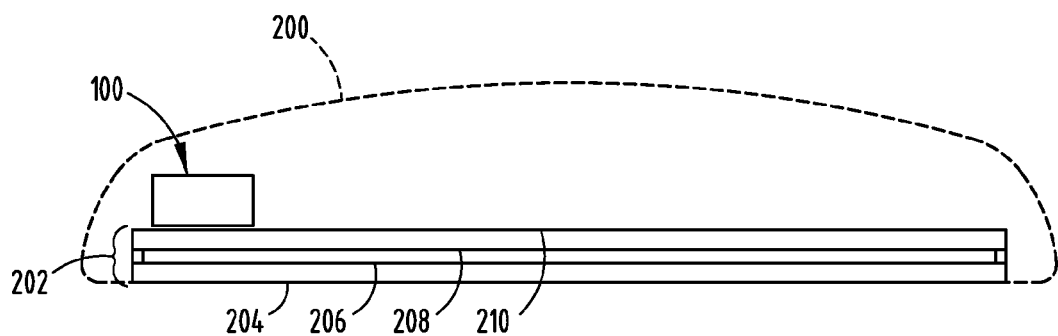
FIG. 3 is a diagrammatic view of a light system incorporated in a rearview mirror assembly having an electro-optic mirror element, in accordance with one embodiment of the present invention.
Figure 4:
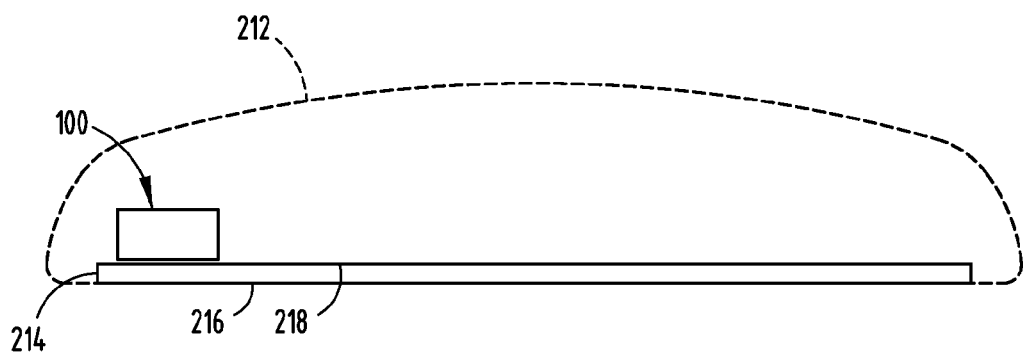
FIG. 4 is a diagrammatic view of a light system incorporated in a rearview mirror assembly having a non electro-optic mirror element, in accordance with one embodiment of the present invention.
Figure 5:
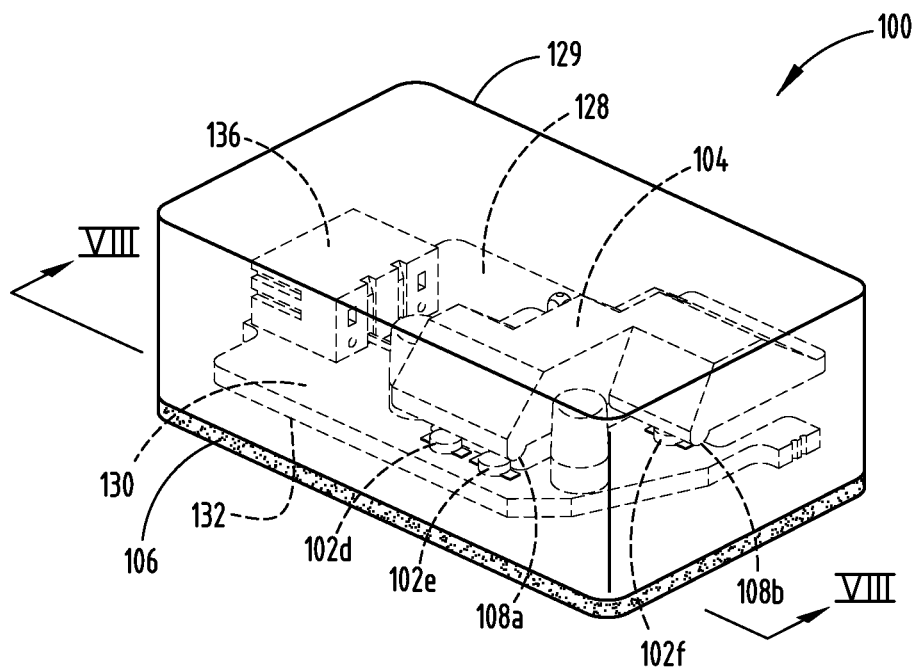
FIG. 5 is a perspective view of a light system, in accordance with one embodiment of the present invention.
Figure 6:
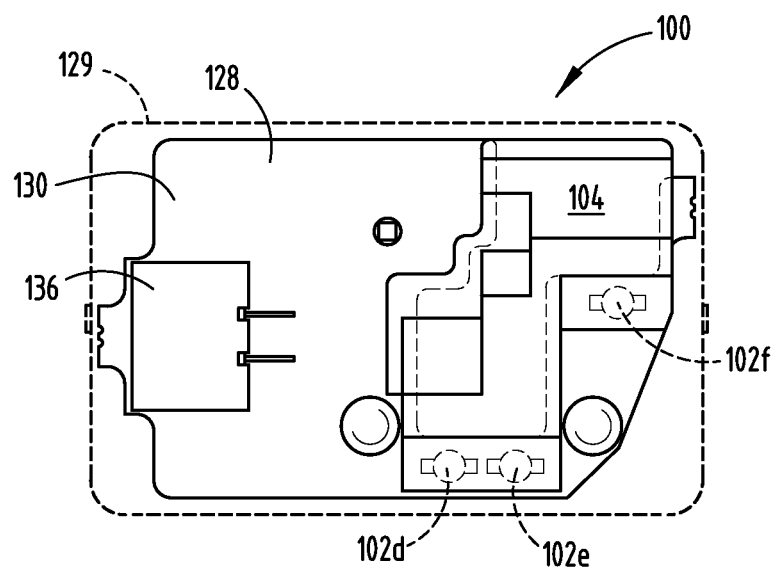
FIG. 6 is a top view of the light system of FIG. 5.
Figure 7:
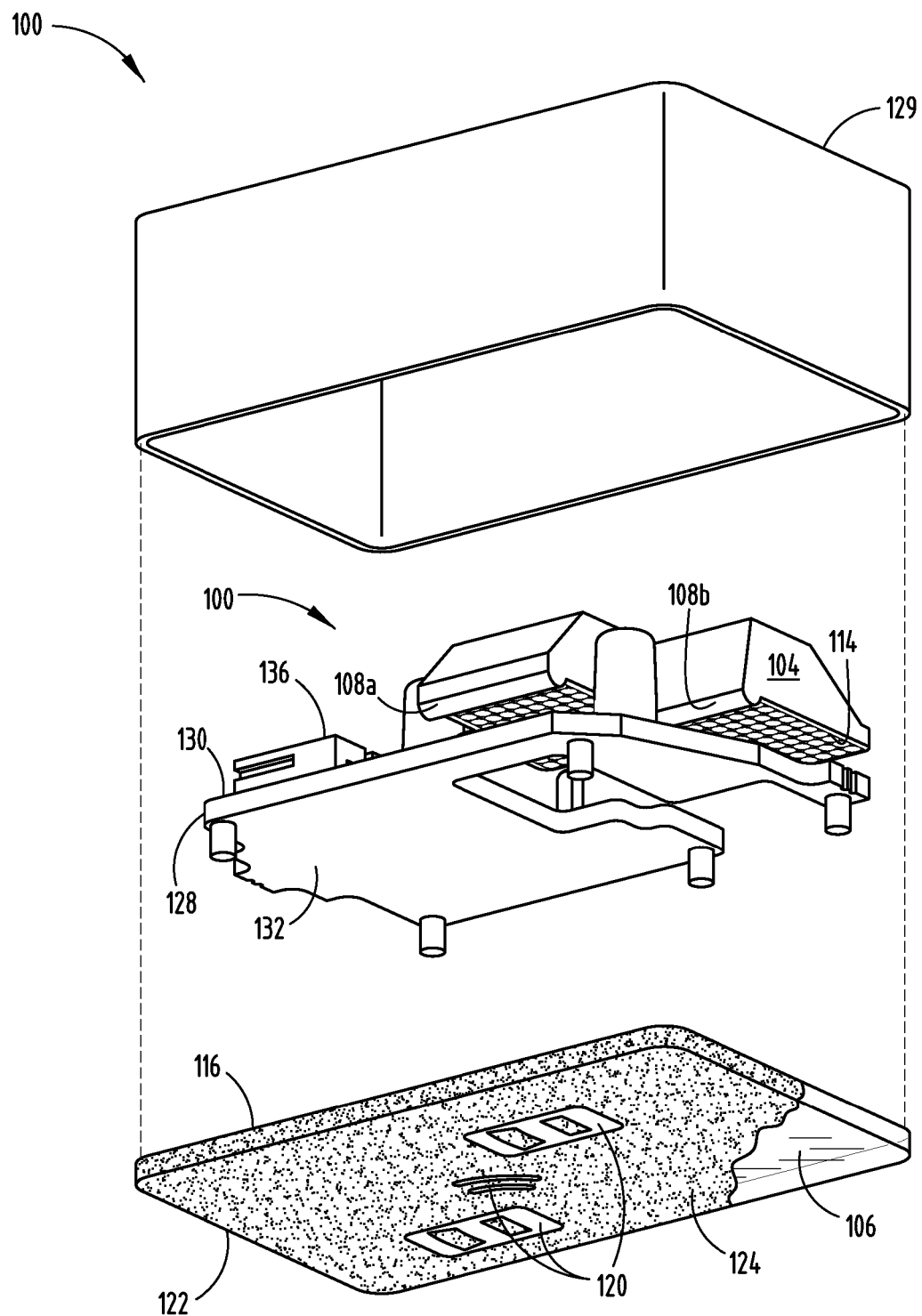
FIG. 7 is a partial exploded view of the light system of FIGS. 5 and 6.
Figure 8:
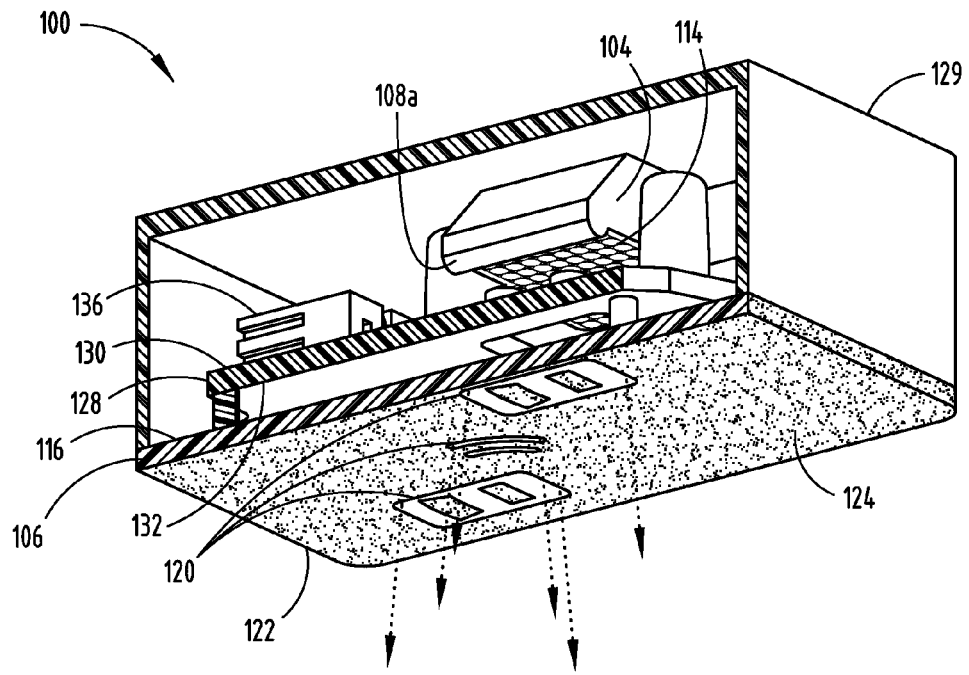
FIG. 8 is a cross sectional view of the light system taken along lines VIII-VIII of FIG. 5.

Alternatively, the second optical element 106 can also be provided without the indicia 120 when a rearview mirror assembly already includes desired indicia. For instance, as shown in FIG. 3, the light system 100 can be used in a rearview mirror assembly 200 having an electro-optic mirror element 202 (e.g. an electrochromic mirror) with multiple surfaces, shown as a first surface 204, a second surface 206, a third surface 208, and a fourth surface 210. In such an arrangement, indicia (not shown) can be located on either one of the first, second, third, and fourth surfaces 204-210. Accordingly, the light system 100 can be positioned proximate the interior-most surface (fourth surface 210) of the rearview mirror assembly 200 and properly aligned such that light exiting from the second optical element 106 or the first optical element 104 (if the second optical element 106 is not used) can illuminate the indicia. In another instance, as shown in FIG. 4, the light system 100 can be used in a rearview mirror assembly 212 having a non electro-optic mirror element 214 (e.g. a glass mirror element) with a first surface 216 and a second surface 218. In such an arrangement, indicia (not shown) can be located on either one of the first and second surfaces 216, 218. Accordingly, the light system 100 can be positioned proximate the interior-most surface (second surface 218) of the rearview mirror assembly 212 and properly aligned such that light exiting from the second optical element 106 or the first optical element 104 (if the second optical element 106 is not used) can illuminate the indicia. For rearview mirror assemblies lacking indicia, a light system having a second optical element with an indicia can be similarly incorporated therein.

Referring to FIGS. 5-8, the light system 100 is shown according to another embodiment. In the illustrated embodiment, the light system 100 includes a printed circuit board (PCB) 128 secured inside a cover 129 (e.g. via mechanical fasteners, friction, or other suitable means) and having a first side 130 and a second side 132. The light source, shown as LEDs 102d, 102e, and 102f, are located on the first side 130 of the PCB 128 and are exemplarily shown in a non-linear configuration. The first optical element 104 is coupled to the first side 130 of the PCB 128 and is located in an elevated position relative to LEDs 102d, 102e, and 102f such that LEDs 102d and 102e are proximately aligned with collection optic 108a and LED 102f is proximately aligned with collection optic 108b. The first optical element 104 can be coupled to the first side 130 of the PCB 128 using standoffs or the like. As shown, the PCB 128 has a gap, through which light exiting the first optical element 104 (via the output surface 114) propagates towards and is received in the second optical element 106, which is located on the second side 132 of the PCB 128. While the gap is shown having a similar profile to the output surface 114 of the first optical element 104, it should be appreciated that the gap is not necessarily limited to any particular shape and/or size.

Figure 9:
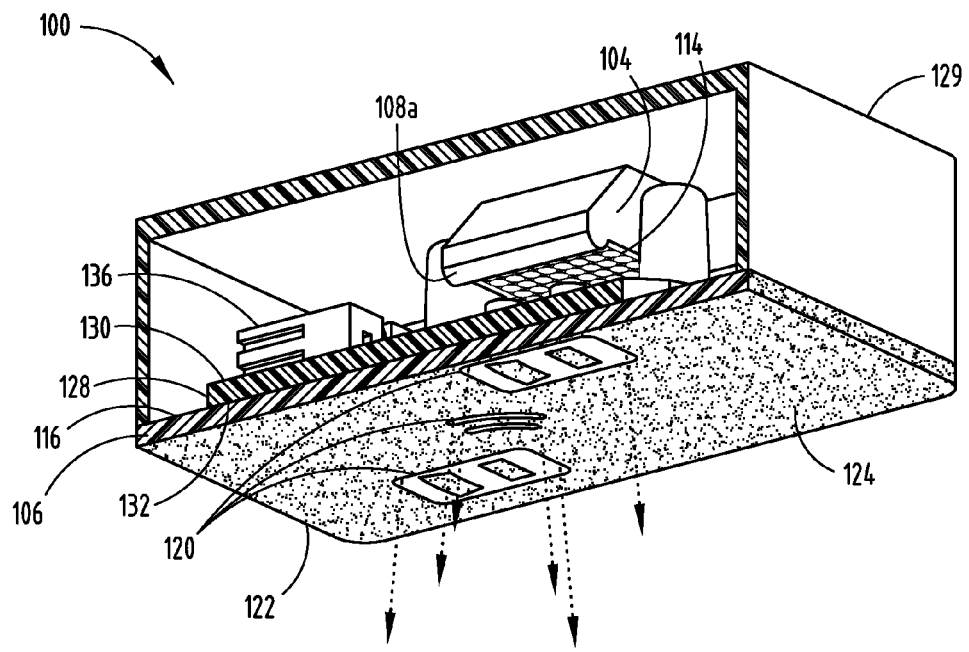
FIG. 9 is an alternative embodiment of the light system of FIG. 6.

In the illustrated embodiment, the second optical element 106 can be coupled to the second side 132 of the PCB 128 using standoffs or the like. Alternatively, the second optical element 106 can directly contact the PCB 128, thereby reducing the height of the light system 100 (see FIG. 9). In any event, the second optical element 106 and the cover 129 can cooperate to define a sealed housing that encloses the PCB 128, the LEDs 102d-102f, and the first optical element 104, which can be accomplished via laser welding or other suitable means. Alternatively, the second optical element 106 is not included in the light system 100, the cover 129 can be configured to cooperate with the PCB 128 to define the housing. Such an arrangement can be advantageous when a rearview mirror assembly already has desired indicia. As previously mentioned, some rearview mirror assemblies may already have indicia located on at least one surface of an electro-optic mirror element (e.g. electrochromic element) or a non electro-optic mirror element, thus obviating the need to either provide a like indicia on the second optical element 106 or include the second optical element 106 altogether in the light system 100. In such circumstances, light exiting the second optical element 106, or the first optical element 104 (in the absence of the second optical element 106) can be used to illuminate indicia of the rearview mirror assembly. Regardless of configuration, the light system 100 advantageously provides for a low profile (e.g., thin) packaged design and can be integrated with other electrical devices via electrical connector 136, which can be configured to receive electrical power and/or make electrical connections. According to one embodiment, the light system 100 described herein can have a height of less than approximately 8.5 mm, or less than approximately 8.2 mm and can be configured to have a low profile without including a metalized coating reflector.

Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A light system for use in a rearview mirror assembly, comprising:
a printed circuit board having a first side and a second side;
a light source located on said first side;
a first optical element coupled to said first side and having:
a collection optic configured to direct light received from said light source;
a reflector optic in optical communication with said collection optic and configured to reflect light received from said collection optic; and
a plurality of light steering areas configured to steer light propagating in said first optical element, wherein light steered from each of said plurality of light steering areas exits said first optical element via an output surface located adjacent to said collection optic; and
a second optical element coupled to said second side and in optical communication with said first optical element, wherein said second optical element is configured to diffuse light received from said first optical element to illuminate an indicia.

2. The light system of claim 1, wherein said collection optic is elongate and said light source comprises a plurality of light emitting diodes spaced along a length of said collection optic and proximately aligned with said collection optic.

3. The light system of claim 1, wherein each of said plurality of light steering areas is located at a different distance from said reflector optic than the others of said plurality of light steering areas and is staggered relative to the others of said plurality of light steering areas.

4. The light system of claim 1, wherein said indicia is located on a structure selected from a group comprising: said second optical element, an electro-optic mirror element, and a non electro-optic mirror element.

5. The light system of claim 1, wherein said printed circuit board has a gap, through which light exiting said first optical element propagates towards and is received in said second optical element.

6. The light system of claim 1, further comprising a cover configured to cooperate with said second optical element to define a housing that encloses said printed circuit board, said light source, and said first optical element.

7. A light system for use in a rearview mirror assembly, comprising:
a light source;
a first optical element having:
a collection optic configured to direct light received from said light source;
a reflector optic in optical communication with said collection optic and configured to reflect light from said collection optic;
a plurality of light steering areas configured to steer light propagating in said first optical element; and
a light spreading optic configured to spread light exiting said first optical element;
a second optical element in optical communication with said first optical element and configured to diffuse light received from said first optical element to illuminate an indicia; and
a printed circuit board having a first side and a second side, wherein said light source is located on said first side, said first optical element is coupled to said first side, and said second optical element is coupled said second side.

8. The light system of claim 7, wherein said printed circuit board has a gap, through which light exiting said first optical element propagates towards and is received in said second optical element.

9. The light system of claim 8, wherein said first optical element is located in an elevated position relative to said light source and said second optical element contacts said second side of said printed circuit board.

10. The light system of claim 7, wherein said collection optic is elongate and said light source comprises a plurality of light emitting diodes spaced along a length of said collection optic and proximately aligned with said collection optic.

11. The light system of claim 7, wherein each of said plurality of light steering areas is located at a different distance from said reflector optic than the others of said plurality of light steering areas and is staggered relative to the others of said plurality of light steering areas.

12. The light system of claim 7, wherein said indicia is located on a structure selected from a group comprising: said second optical element, an electro-optic mirror element, and a non electro-optic mirror element.

13. A light system for use in a rearview mirror assembly, comprising:
a light source;
a first optical element having:
a collection optic configured to direct light received from said light source;
a reflector optic in optical communication with said collection optic and configured to reflect light received from said collection optic; and
a plurality of light steering areas configured to steer light reflected from said reflector optic, wherein light steered from said plurality of light steering areas exits said first optical element via an output surface located adjacent to said collection optic; and
wherein each of said plurality of light steering areas is located at a different distance from said reflector optic than the others of said plurality of light steering areas and is staggered relative to the others of said plurality of light steering areas.

14. The light system of claim 13, further comprising a second optical element in optical communication with said first optical element and configured to diffuse light exiting said first optical element to illuminate an indicia.

15. The light system of claim 14, further comprising a printed circuit board having a first side and a second side, wherein said light source is located on said first side, said first optical element is coupled to said first side, and said second optical element is coupled to said second side.

16. The light system of claim 15, wherein said printed circuit board has a gap, through which light exiting said first optical element propagates towards and is received in said second optical element.

17. The light system of claim 14, wherein said indicia is located on a structure selected from a group comprising: said second optical element, an electro-optic mirror element, and a non electro-optic mirror element.

18. The light system of claim 13, wherein said collection optic is elongate and said light source comprises a plurality of light emitting diodes spaced along a length of said collection optic and proximately aligned with said collection optic.

19. A light system for use in a rearview mirror assembly, comprising:
a light source;
a first optical element having:
a collection optic configured to direct light received from said light source;
a reflector optic in optical communication with said collection optic and configured to reflect light from said collection optic;
a plurality of light steering areas configured to steer light propagating in said first optical element; and
a light spreading optic configured to spread light exiting said first optical element;
a second optical element in optical communication with said first optical element and configured to diffuse light received from said first optical element to illuminate an indicia; and
wherein each of said plurality of light steering areas is located at a different distance from said reflector optic than the others of said plurality of light steering areas and is staggered relative to the others of said plurality of light steering areas.

20. The light system of claim 19, wherein said collection optic is elongate and said light source comprises a plurality of light emitting diodes spaced along a length of said collection optic and proximately aligned with said collection optic.

21. The light system of claim 19, wherein said indicia is located on a structure selected from a group comprising: said second optical element, an electro-optic mirror element, and a non electro-optic mirror element.

22. A light system for use in a rearview mirror assembly, comprising:
a light source;
a first optical element having:
a collection optic configured to direct light received from said light source;
a reflector optic in optical communication with said collection optic and configured to reflect light received from said collection optic;
at least one light steering area configured to steer light reflected from said reflector optic, wherein light steered from said at least one light steering area exits said first optical element via an output surface located adjacent to said collection optic;
a second optical element in optical communication with said first optical element and configured to diffuse light exiting said first optical element to illuminate an indicia; and
a printed circuit hoard having a first side and a second side, wherein said light source is located on said first side, said first optical element is coupled to said first side, and said second optical element is coupled to said second side.

23. The light system of claim 22, wherein said printed circuit board has a gap, through which light exiting said first optical element propagates towards and is received in said second optical element.

24. The light system of claim 22, wherein said indicia is located on a structure selected from a group comprising: said second optical element, an electro-optic mirror element, and a non electro-optic mirror element.

25. The light system of claim 22, wherein said collection optic is elongate and said light source comprises a plurality of light emitting diodes spaced along a length of said collection optic and proximately aligned with said collection optic.

* * * * *

UNITED STATES PATENT AND TRADEMARK OFFICE
CERTIFICATE OF CORRECTION

PATENT NO. : 9,028,119 B2  
APPLICATION NO. : 14/142011  
DATED : May 12, 2015  
INVENTOR(S) : Lisowski et al.

Page 1 of 1

It is certified that error appears in the above-identified patent and that said Letters Patent is hereby corrected as shown below:

In the Claims

Col. 6, claim 7, line 57;

After "coupled" insert --to--.

Col. 8, claim 22, line 42;

"hoard" should be --board--.

Signed and Sealed this
Eighth Day of December, 2015

Michelle K. Lee
*Director of the United States Patent and Trademark Office*